April 11, 1961 — W. C. RIESTER ET AL — 2,978,728
WINDSHIELD WIPER SYSTEM
Filed Dec. 24, 1957 — 2 Sheets-Sheet 1
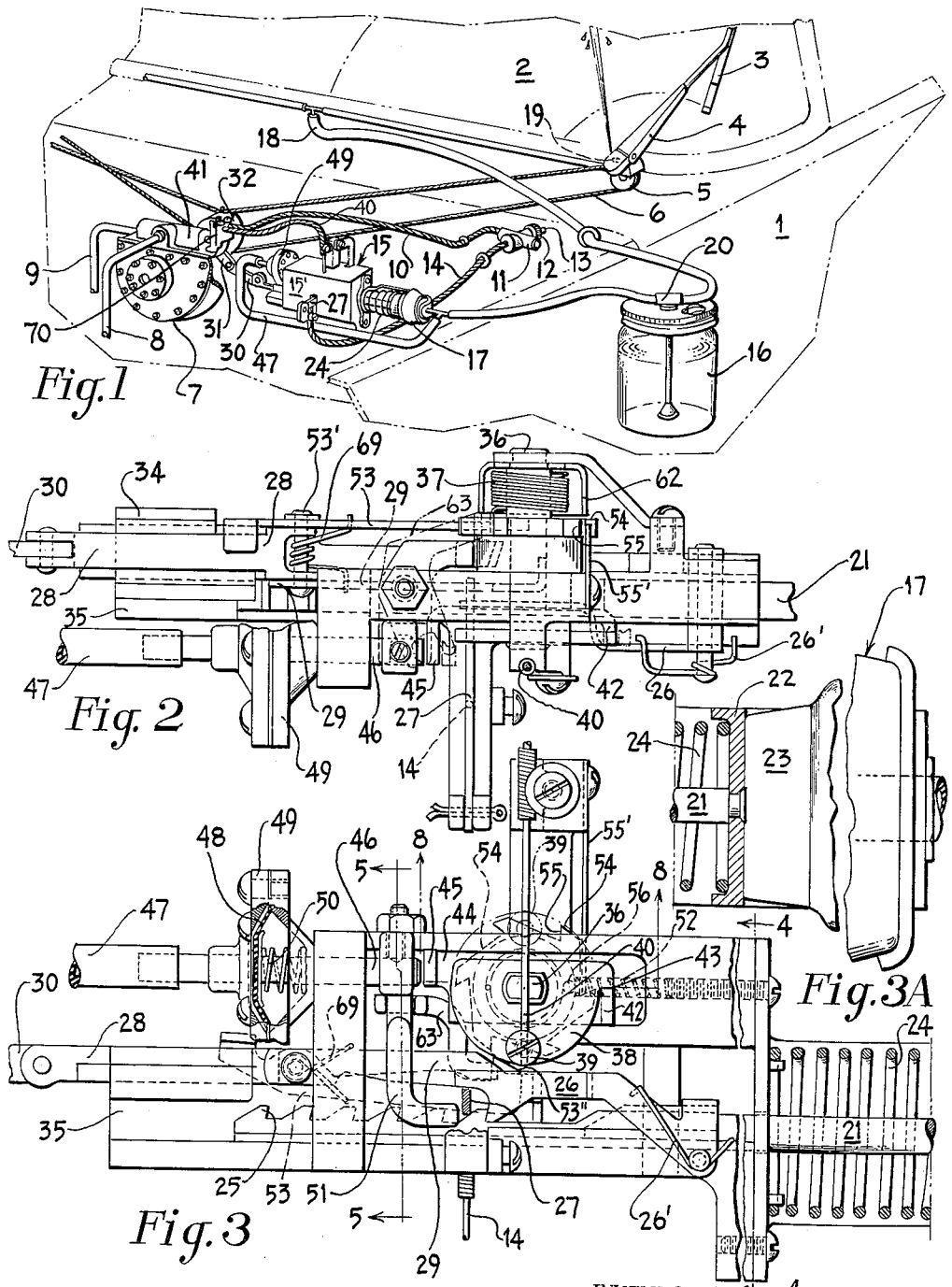
INVENTORS.
WILLIAM C. RIESTER
and RAYMOND D. PAGE
BY Bean Brooks Buckley & Bean
ATTORNEYS

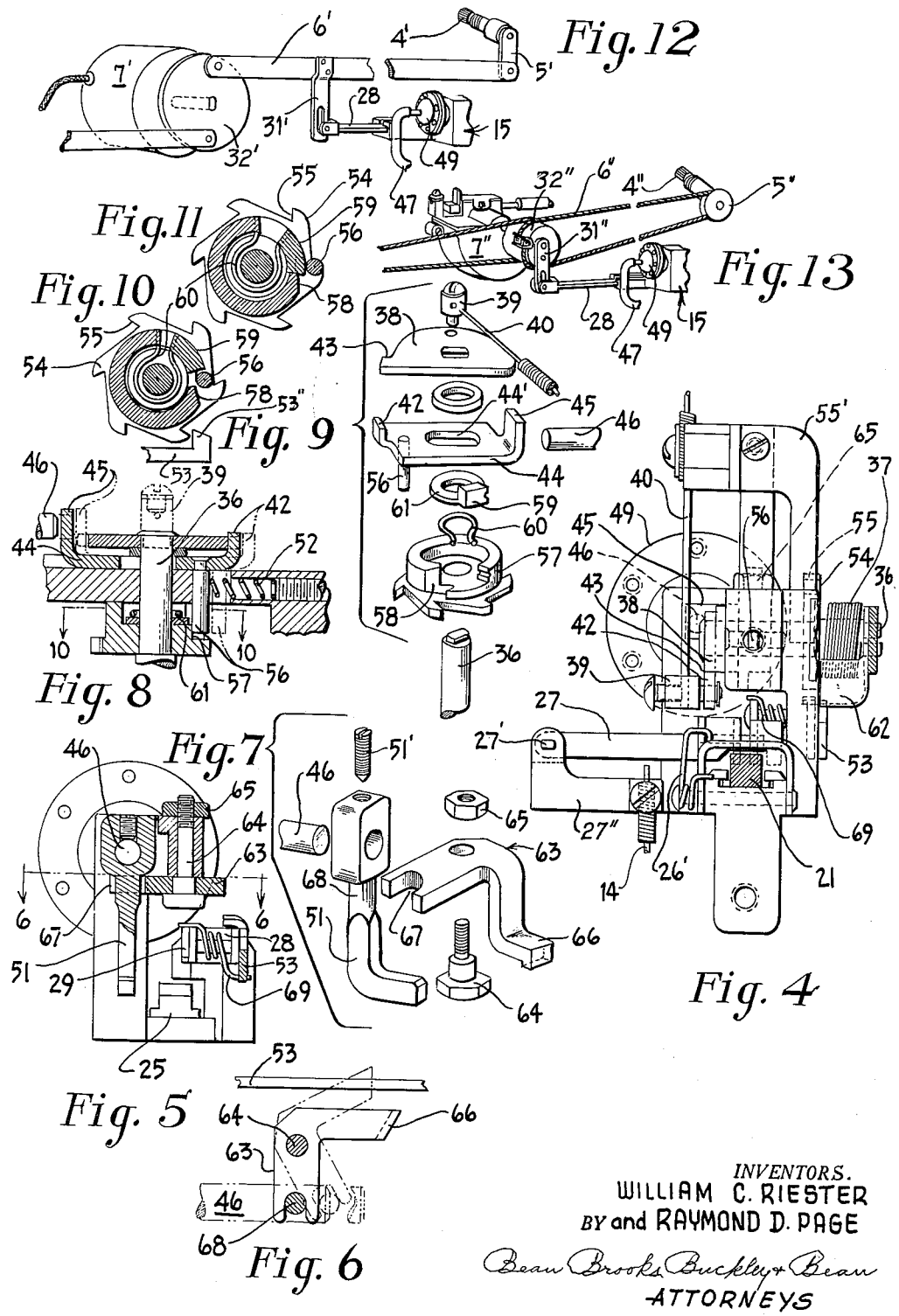

United States Patent Office 2,978,728
Patented Apr. 11, 1961

2,978,728

WINDSHIELD WIPER SYSTEM

William C. Riester, Buffalo, and Raymond D. Page, Eggertsville, N.Y., assignors to Trico Products Corporation, Buffalo, N.Y.

Filed Dec. 24, 1957, Ser. No. 704,951

22 Claims. (Cl. 15—250.02)

This invention relates to the windshield cleaning art and more particularly to a coordinated washer and wiper system that is universal in its application to automatic windshield cleaners whether powered by fluid pressure or by electricity.

Heretofore, when the commercially used automatic washer-wiper system was called into action for wetting the windshield surface, it was first necessary for the washer unit, normally empty, to intake a charge of cleaning solution before delivering it onto the window surface.

The prime purpose of the invention is to obtain the prompt cleaning of a beclouded windshield to quickly restore clear vision ahead for utmost safety.

According to the present invention, the washer unit is normally charged and cocked, ready for trigger release. The wiper motor, as it finishes off one coordinated cycle, automatically conditions the washer unit for the next cycle of operation by intaking another charge of the washing solution and also presetting the unit to go off immediately by trigger actuation. This is accomplished by power from the windshield cleaner motor which serves to store up spring energy in an automatic pump and to actuate the latter on its intake stroke during the dry wiping cycle of the wiper unit. The sequential operation of the two units is such that the washer unit precedes the wiper unit with its delivery of washing fluid and thereafter the wiper unit, in responding to the hydrostatic pressure of the washing fluid being delivered, will energize the windshield wipers immediately to spread the liquid over the surface for a thorough scrubbing and cleaning of the surface. The washer unit embodies a spring actuated pump that is normally cocked and set for the release of its stored-up potential energy, when a button or trigger is manually operated to discharge its liquid content. The hydrostatic pressure to which the liquid is subjected is utilized, first, to hold the trigger operative after manual release of the button to complete the pump delivery stroke; second, to lock the wiping stroke counter inoperative until the water delivery ceases; and finally to bring the wiper unit into operation, in sequential order. Means are also provided to preclude the wiping action in the absence of a proper amount of washing fluid, under which circumstances the coordinated action fails to materialize. Thus, the wiper unit remains inactive to avoid smearing the windshield surface.

Further, the invention resides in a coordinated washer-wiper system which is normally primed for expediting the cleaning of the field of vision.

In the illustrated embodiment, the washer means is provided with a trigger-releasable, automatic pump that is motor-charged and cocked for immediate delivery and for reacting through its developed pressure to bring the wipers into operation after the initial wetting of the windshield surface. After the fluid delivery ceases and the hydrostatic pressure dissipates, means are provided for extending the wiping action for a definite number of surface-drying strokes and at the same time to recharge and recock the pump for its next use.

The foregoing and other objects will manifest themselves as the following description progresses, reference being made therein to the accompanying drawings, wherein Fig. 1 is a fragmentary phantom view in perspective of a motor vehicle having a washer-wiper system according to the present invention wherein the wiper motor is hydraulically actuated;

Fig. 2 is a plan view of the system coordinator embodying the present invention, the pump being omitted;

Fig. 3 is a side elevation of the wiper coordinating and pump resetting mechanism of the washer unit;

Fig. 3A is a similar view of the pump which is herein carried by the coordinating mechanism;

Fig. 4 is an end elevation of the coordinating mechanism on line 4—4 of Fig. 3;

Fig. 5 is a vertical cross section about on line 5—5 of Fig. 3, showing the trigger latch and counting pawl interlocking parts;

Fig. 6 is a horizontal section taken about on line 6—6 of Fig. 5;

Fig. 7 is an exploded view of such interlocking parts;

Fig. 8 is a horizontal section about on line 8—8 of Fig. 3 through the drying stroke counter and the wiper starting and stopping mechanism;

Fig. 9 is an exploded view of such mechanism;

Fig. 10 is a cross sectional view about on line 10—10 of Fig. 8 showing the parts in their normal arrested position;

Fig. 11 is a like sectional view showing the parts at the start of the stroke count for the drying wiper strokes;

Fig. 12 is a fragmentary view of the coordinator unit as applied to an electric windshield cleaner; and Fig. 13 is a like view of a vacuum operated windshield cleaner system.

Referring more particularly to the drawings, the numeral 1 designates a motor vehicle having a curved windshield 2, such as the modern panoramic type, which is wiped at each of its opposite corners by a wiper 3, only one being shown. Each wiper is carried by an oscillating arm 4 that is fixed to a pivot shaft having a pulley 5 about which takes the cable transmission 6 for operatively connecting it to a driving member fixed on the output shaft of a hydraulic motor 7. This crank member is well known in the field and may be in the form of a double throw crank arm, a drum, or a pulley. The motor depicted in Fig. 1 is of the hydraulic type and has inlet and outlet flow connections 8 and 9 in a closed hydraulic circuit with a source of pressurized liquid in the vehicle power plant. A source which has proved satisfactory for this purpose is found in the automatic transmission, as taught in Patent No. 2,802,232. The wiper motor 7 is turned on by a control knob 12 acting through a rack and pinion coupler 11 and a Bowden cable 10.

The washer system, having a push button control 13 conveniently arranged within the wiper knob 12, is connected by Bowden cable 14 to a coordinator unit, generally indicated by the numeral 15, which is designed to bring the wiper into action automatically whenever a demand is made upon the washer system. The washer system includes a reservoir 16 and a pump 17, the latter being designed to deliver a charge of liquid through conduits 18 to nozzles 19 for jetting washing fluid onto the windshield in the path of the wipers. A valved coupling T 20 enables the pump to intake a charge of liquid from the reservoir on one stroke and to deliver it out through the nozzles on the other stroke. The pump may be of any suitable construction, such as a piston and cylinder, but is herein shown in the form of a rubber bellows or chamber. By collapsing the bellows, the washing fluid is pressurized and squirted onto the windshield, and upon the release of the deforming pressure the bellows will expand to intake a new charge of the washing solution from the reservoir so that normally the pump will be charged for instant action when the washer system is next used.

A presettable and resettable pump operating mechanism is provided, the same having a ram rod 21 with a head 22 that seats upon a pressure pad 23 of the bellows to form therewith a plunger for the pump chamber 17. The plunger is normally under the urge of a spring 24. The ram rod 21 has a series of teeth 25, which teeth are engageable successively by a holding dog or pawl 26 as the plunger 22, 23 is mechanically retracted to build up a potential energy in the spring for a subsequent release. (In lieu of the rubber bellows, a cylindrical chamber and plunger may be used.) When the dog is manually lifted from tooth engagement, the spring will expend its pent-up energy to move the plunger on its discharge stroke to displace the liquid content from the pump chamber onto the windshield. The holding dog 26 is disengaged by the Bowden wire 14 that is slidable upwardly against a trigger lever 27 which is pivoted at 27' on a bracket 27". By simply pushing on the button 13, the operation of the washer system will be initiated.

To recharge the pump, and also to reenergize the pump spring 24, the ram rod is retracted automatically by the windshield cleaner motor through an actuating slide 28 that carries a ratcheting pawl 29 which is spring pressed into engagement with the teeth 25. The retraction of the ram rod is intermittent as the ratcheting pawl 29 engages one tooth at a time until the spring 24 is fully compressed and the pump chamber fully recharged with the washing fluid from the reservoir. Each step or increment of movement in this progressive retraction of the plunger brings from the reservoir 16 a quantity of the washing solution to build up in the pump chamber an accumulation to recharge the pump. For imparting this back and forth movement to the slide 28, the latter is connected by a link 30 to a driving crank 31 on the driving drum 32 fixed on the drive shaft of the wiper motor. This drive shaft is oscillated by the reverse applications of pressure differential to a piston as is accomplished in a motor construction shown in the aforesaid patent. When the wiper shaft oscillates the actuating slide 28 will reciprocate within its guideway 34 in a support 35. With each return motion of the slide, its pawl 29 will engage a new tooth while the ram rod is held by the dog 26. On the retracting stroke of the slide, the rack will be withdrawn a distance of one tooth where it will again be held by the dog dropping behind the next tooth of the series, and this intermittent step by step withdrawal will not only compress the pump actuating spring 24, storing up energy therein for the next use of the washer unit, but it will also intake a new charge of washing fluid. The ratcheting pawl 29 overhangs the trigger 27 to effect tooth disengagement whenever the washer control 13 is depressed. Thus, its Bowden wire 14 will displace both the dog 26 and the ratcheting pawl 29 from the path of the ram rod teeth 25 to free the spring 24 for expressing the washing fluid out onto the windshield.

A wiper coordinating unit is herein combined with the pump mechanism and is made responsive thereto to insure a surface wetting before starting the wipers. Such coordinator unit comprises a shaft 36, which is urged in a clockwise direction by a torsional spring 37, and a crank-functioning trip plate 38 that is fixed to turn with the shaft. The plate has a crank pin 39 which is connected by a Bowden wire 40 to the windshield cleaner control valve 41. This trip plate 38 is normally under the urge of the torsional spring 37 but is restrained by a stop lug 42 engaging beneath the shoulder 43 on the plate. The stop lug 42 is carried at one end of a slidable interlocking plate 44 to one side of the shaft 36, while a second upstanding stop lug 45 is formed on the opposite end of the plate and to the opposite side of the shaft. These two lugs 42, 45 confine the rotary movement of the interlocking plate to half turns, the lug 42 holding the crank pin 39 in its wiper arresting position and the lug 45 holding the crank pin in its wiper operating position. The interlocking plate is formed with a slot 44' to receive the shaft and thereby enable its being shifted crosswise of the shaft for disengaging stop lug 42. This permits the trip plate to be rotated one-half turn with the shaft 36 by spring 37 and thereby act through the crank 39 and wire 40 to turn the wiper on. This unlatching shift of the interlocking plate 44 is effected by pin 46 in response to the hydrostatic pressure in the outlet conduit 18 from the pump. To this end, the pump outlet is connected by a conduit 47 to a coordinating motor having a hydrostatic pressure chamber 49 and a diaphragm 48 which latter responds to the fluid pressure and moves the wiper starting or coordinating pin 46 against the lug 45 to slide the interlocking plate to the right in Fig. 3. A spring 50 withdraws the pin from the lug 45 after the hydrostatic pressure has spent itself, the opposite end of the pin being connected to the diaphragm. When the hydraulic pressure moves the diaphragm against the urge of its spring 50, the pin 46 will be projected to shift the lock plate 44 to displace the stop lug 42 from beneath the shoulder 43 of the crank plate 38, and to place the stop lug 45 in the path of the oncoming shoulder 43 to arrest the lock plate 44 at its half-way mark whereat the Bowden wire 40 will hold the wiper motor control 41 in its operative position. Since the coordinating motor 48, 49 is responsive to the washer system, it will be evident that the washing fluid will be delivered to the windshield prior to the start of the windshield wipers.

Fixed on the wiper coordinating pin 46 of the hydraulic motor 48, 49 by a set screw 51' is a latch 51 which moves as a unit with the pin to under-engage the manually elevated trigger lever 27 for holding the pawls 26 and 29 elevated out of tooth engagement while the spring 24 continues its water expressing action during the early stroking of the wipers 3 back and forth across the windshield. After the pump delivers its charge of washing solution, the wiper motor will continue to stroke the wipers for a predetermined number of surface drying sweeps, even though the hydrostatic pressure in the coordinating motor 48, 49 may have spent itself. When the pressure dissipates, the spring 50 will withdraw the pin 46 while the spring 52, Fig. 8, will return the lock plate 44 to place the stop lug 42 in its normal position for holding the wipers parked. However, the actual parking is delayed by a ratcheting device that first counts off a predetermined number of surface drying strokes designed to wipe off all excess moisture or substantially all. This stroke-counting timing device finishes off the windshield cleaning operation with the torsional spring 37 rotating the crank or trip plate 38 to its wiper arresting position.

The timing device includes a pawl 53, which is pivotally mounted by a pin 53' on the actuating slide 28, and a ratchet wheel 54. As the slide is pulled back by the wiper motor, its timing pawl 53 will impart rotary movement to the toothed wheel 54 and concurrently draw back the ratcheting pawl 29 with the ram rod 21 for intaking the next charge of the washing fluid. The number of wiper strokes is determined by the number of teeth 55 on the wheel. Carried by the lock plate 44 is a pin 56 which rides the periphery of a hub 57 on the timing ratchet wheel 54 to support the lock plate against the urge of its spring 52 until a recess 58, Fig. 10, presents itself to receive the pin whereupon the lock plate may complete its movement to fully displace the stop lug 45 and free the crank member 38 to arrest the wiper. Within the recess 58 in a recess-closing segment 59 that is pivotally mounted on the shaft 36 by a hub 61 and backed by a U-shaped spring 60 for yielding circumferentially to open up the recess for the reception of the pin. The primary function of the segment is to support the pin and its slide outwardly against the urge of spring 52, Fig. 11. In this outward position which it assumes by the hydrostatic response of the coordinating pin 46, the stop lug 42 is displaced and the stop lug 45 is engaged by the shoulder 43 to maintain wiper operation. When the time delay ratchet mechanism 53, 54 begins to function again, the pin-supporting segment will carry the pin 56 over onto the main hub portion and thereafter be released to its normal pin-obstructing position ready for the next encounter with the pin.

Whenever the cleaner motor is operating the moving part 28 is reciprocated, and in order to keep the timing pawl 53 from engaging the ratchet wheel 54 during the sole operation of the wiper unit, there is provided a sheath 62 over the wheel on which the beveled nose 53" may ride to depress it and hold it away from the ratchet to preclude the timing pawl 53 from counting off the wiper strokes. This sheath is fixed to the shaft 36 to rotate with it on every half turn. When the crank pin 39 is in the lower position, Fig. 3, the sheath is disposed within the path of the nose 53" to render the timing pawl 53 inoperative; when the coordinated system is in operation and the hydrostatic pressure has functioned to release the trip plate 38 to make its first half turn, then the crank pin will be in its upper position, Fig. 3, and the sheath will be positioned to expose the timing ratchet.

During the coordinated action, other means are provided to hold the timing pawl inoperative until the washing solution has been applied to the windshield surface. Such other means comprises a bellcrank lever 63, Fig. 7, pivotally mounted on a fixed part of the support or body 35 by a bolt 64 and nut 65, one arm 66 of the bellcrank being designed to move over the timing pawl when the actuating pin 46 is responding to the hydrostatic pressure while the other end 67 is bifurcated to straddle a round portion 68 on the latch 51.

The holding dog 26 is urged into engagement with the rack 25 by a spring 26', and a second spring 69 serves a dual function by having one end bearing downwardly upon the pawl 29 and its opposite end lifting up on the ratchet pawl 53, Fig. 5, to hold these two pawls operative.

In operation, wiper operation alone is obtained by merely turning the knob 12 to act through cable 10 to open the motor valve 41. For coordination of the wiper with the washer, the button 13 is depressed to act through Bowden cable 14 to set the combined system in operation. The two cables 10 and 40 are connected to the wiper motor control 41 by a coupler 70, similar to that disclosed in Patent No. 2,769,194, which enables independent operation of both cables. Actuating the button 13 lifts the trigger 27 to disengage the dog 26 and pawl 29 from the rack 25, whereupon the washing solution will be discharged through the conduits 18 to wet the windshield surface and also through the conduit 47 to project the starting pin 46. The hydrostatic response of the starting pin serves to place the latch 51 under the parts 26 and 29 to take over from the finger. The hydrostatic pressure also serves to shift the interlocking plate 44 to displace the stop lug 42 and to place the stop lug 45 for arresting the rotating cranking trip plate 38 after a half turn to maintain the wipers in operation. By the forward movement of the starting pin 46, the arm 66 of the bellcrank lever 63 is also positioned to block the timing pawl 53 from becoming effective until after the washing solution has already wet the surface and spent its energy whereupon the hydrostatic pressure in chamber 49 will lessen and the spring 50 will come into play to retract the starting pin 46. At this time the spring 52 moves the interlocking plate 44 to displace the stop lug 45 for releasing the torsional spring 37 for another half turn of the trip plate to its normal motor-arresting position as determined by the shoulder 43 engaging the properly placed stop lug 42. However, this arrest of the wipers is not accomplished until after a predetermined number of wiping strokes when the timing pin 56 drops into the recess 58 of hub 57 on the timing ratchet 54. After the discharge stroke is complete and the hydrostatic pressure dwindles away, the intake stroke automatically follows during functioning of the stroke counting mechanism since the counting or timing pawl is released by the withdrawal of the holding arm 66 from its pawl-blocking position. Each stroke of the motor-driven slide 28 advances the timing ratchet 54 one tooth and retracts the pump plunger a distance of one tooth. After pawl 53 advances timing ratchet 54, a spring steel holding pawl 55', which is attached to the frame of the coordinator 15 (Figs. 2, 3, and 4), holds ratchet 54 in the advanced position. The number of wiping strokes for drying the surface is determined by the number of teeth 55 on the ratchet, and these teeth equal in number to the teeth 25 on the plunger rod 21.

In lieu of the hydraulic motor 7 and electric motor 7', Fig. 12, may be employed for operating the wiper, the pivot shaft 4' of the wiper having a rocker arm 5' connected by a transmission link 6' to the central oscillation driving crank 32'. The link carries an arm 31' connected to the slide 28.

A pneumatic motor 7", either vacuum or compressed air, may be used, its driving pulley or crank 32" being connected by a transmission cable 6" to the pulley 5" on wiper pivot shaft 4" which carries the wiper carrying arm 4, Fig. 1. The driving crank 32" has an arm 31" to which the slide 28 is pivotally connected. The coordinating mechanism may be enclosed within a protective housing 15'.

Whenever the stroke counting pawl 53 is functioning, the pump pawl 29 is also functioning to impart the intake stroke of the pump. As soon as the pump has intaken its next charge of washing solution, the dog 26 will retain the automatic pump fully charged and ready for its next call. The plunger parts 22 and 23 may be integrally connected so that the withdrawal of the pump rack will assist the chamber 17 intaking its charge of washing solution. The pump is automatic in its action on both strokes. The hydrostatic pressure maintains the pump operation and starts the wipers in timed operation. The counting pawl 53 is ineffective until the completion of the discharge stroke when the spring 50 takes over and frees the counting pawl to recharge the pump.

The washer pumping unit, with its built-in coordination, in which the wiper motor powers the jets, is universal in its application for coupling with either hydraulic, vacuum or battery-powered motors. The coordination for the joint operation of windshield washers and wipers, with touch-button release, is provided through the use of potential energy produced by the wiper motor and stored up during each preceding timed cycle of dry wiping. This preliminary storage of potential energy for pump operation is normally cocked for trigger release and is reset by the windshield cleaner motor at the close of the operation of the coordinated system. The sequential operation of the two units is initiated by utilizing the hydrostatic pressure, built up in the washer pump to activate the wiper motor. Then the predetermined, measured washing and wiping cycle, starting after the water is first jetted onto the windshield, with dry wiping continued after the water delivery ceases, is controlled by ratchet-regulated coordination. The predetermined dry wiping cycle of the wiper blades, in the execution of an extended dry wiping pattern, is carried throughout the full arc of the path of the blade from the extreme outboard to the arrested parked position of the blades, thereby eliminating the tendency to drain back from unwiped areas beyond the path and confining the reversal of the blade to its normal reversing zone. During the entire wiper operation and its final wipe, complete strokes of the wiping blade are executed. A desirable safeguard prevents unwanted wiper action, as when the reservoir is empty. The coordination action of the wiper is then impossible since the automatic secondary wiper control remains dormant to make the combined washer-wiper system safe against smear.

The foregoing description has been given in detail without thought of limitation since the inventive teachings are capable of assuming other physical embodiments without departing from the spirit of the invention and the scope of the appended claims.

What is claimed is:

1. A windshield cleaner comprising a washer system including a spring actuated pump normally cocked for a jetting stroke to wet a surface, a trigger operable to release the pump for such stroke, a wiper system responsive to the pump during its operation for wiping the wet surface, and means for automatically arresting the wiper system in response to continued operation thereof after a pump stroke.

2. A windshield cleaner comprising a washer system including a spring actuated pump normally cocked for a delivery stroke to wet a surface, a trigger operable to release the pump for such operation, a wiper system responsive to the pump during its operation for wiping the wet surface, and means responsive to the operation of said wiper system after the termination of the delivery stroke for recocking said pump and arresting the wiper system.

3. A windshield cleaner comprising a washer system including a spring actuated pump normally charged and cocked for a delivery to wet a surface, a trigger operable to release the pump for actuation by its spring, a wiper system responsive to the delivery pressure of the pump during its operation for wiping the wet surface, and motor actuated means operable to arrest the wiper system and to recock the pump concurrently.

4. A windshield cleaner comprising washer means having a trigger-releasable pump normally preset under spring tension for a delivery stroke of washing fluid, a trigger operable to so release the pump, wiper means responsive to the pump operation, and means actuated by the wiper means operable to reset the pump.

5. A windshield cleaner system comprising a wiper, a motor for operating the same, pump means having an intake stroke and a discharge stroke for delivering washing solution to the wiper, means operable by the motor to impart the intake stroke, manually controlled means operable to impart the discharge stroke of the pump means, and latch means for permitting said pump means to operate after the actuation of said manually controlled means.

6. A windshield cleaner system comprising a wiper, a motor for operating the same, pump means having an intake stroke and a discharge stroke for washing solution, means operable by the motor to impart the intake stroke of the pump means, spring means operating the pump means on its discharge stroke, said motor operable when imparting the intake stroke to store up energy in said spring means, manual means to release the spring energy for pump operation, and latch means for permitting said pump means to operate after said manual means are released.

7. A windshield cleaner system comprising a wiper, a motor for operating the same, a pump having an intake stroke and a discharge stroke for delivering washing solution to the wiper, means operable by the motor intermittently to impart the intake stroke, manually controlled means operable to impart the discharge stroke of the pump, and means responsive to the hydrostatic pressure on the discharge stroke to set the wiper motor in operation.

8. A windshield cleaner system comprising a wiper, a motor for operating the same, a pump having an intake stroke and a discharge stroke for delivering washing solution to the wiper, manually controlled means for operating the pump on its discharge stroke, means responsive to the hydrostatic pressure on the discharge stroke to set the wiper motor in operation, means for continuing the wiper operation after the discharge stroke, and means operable by the wiper motor to recharge the pump during the continued wiper action.

9. A windshield cleaner system comprising a wiper, a motor for operating the same, a pump having an intake stroke and a discharge stroke for delivering washing solution to the wiper, manually controlled means for operating the pump on its discharge stroke, means responsive to the hydrostatic pressure on the discharge stroke to set the wiper motor in operation, means for oscillating the wiper a given number of surface-drying strokes following the discharge stroke, and pump recharging means operable by the wiper motor after the discharging stroke.

10. A windshield cleaner system comprising a wiper, a wiper motor for oscillating the same, a washing solution reservoir, a normally charged pump means, manually controlled means for operating the pump means to discharge solution onto a windshield, means responsive to the hydrostatic pressure on the discharge stroke to set the wiper motor in operation, and means operable by said wiper motor for recharging the pump means to restore the latter to its normal condition.

11. A windshield cleaner system comprising a wiper, a wiper motor for driving the same, a washing solution reservoir, a normally charged pump means, manually controlled means for operating the pump means to discharge solution onto a windshield, means responsive to the hydrostatic pressure on the discharge stroke to set the wiper motor in operation, means operable by said wiper motor for recharging the pump means to restore the latter to its normal condition after the termination of solution discharging, and means for prolonging the wiper motor operation after the discharge.

12. A windshield cleaner system comprising a wiper, a motor for oscillating the same, pump means having an intake stroke imparted by the wiper motor and a discharge stroke with manually controlled means operable to effect the discharge stroke, means responsive to the pressure on the discharging fluid for turning on the motor, and means operable after the pressure subsides to impart the intake stroke to recharge the pump means and then arrest the wiper motor.

13. A windshield cleaner system comprising a wiper, a motor for oscillating the same, pump means having an intake stroke imparted by the wiper motor and a discharge stroke, a spring operable to effect the discharge stroke, said pump means having a retractable rod to compress the spring, motor-actuated means operable to retract the rod to thereby impart the intake stroke to recharge the pump means, means operable to arrest the wiper motor, means to hold the pump means charged when said wiper motor is arrested, and means responsive to the hydrostatic pressure in the discharge from the pump means for starting the wiper motor.

14. A windshield cleaner system comprising a wiper, a motor for driving the same, pump means having an intake stroke imparted by the wiper motor and a discharge stroke, a spring operable to effect the discharge stroke, said pump means having a retractable rod to compress the spring, motor-actuated means operable to retract the rod to thereby impart the intake stroke to recharge the pump means, means operable to arrest the wiper motor, means operable to hold the pump means charged when said wiper motor is arrested, means responsive to the hydrostatic pressure in the discharge from the pump means for starting the wiper motor, release means operable to release the pump holding means, and pressure responsive means to hold the release means operable during the discharge stroke.

15. A windshield cleaning system comprising a wiper blade, a wiper motor for driving said blade, a solvent reservoir, a solvent pump having an intake and discharge stroke, first manually controlled means for causing joint operation of said wiper motor and said pump, linkage means coupling said solvent pump to said wiper motor whereby said wiper motor effects the intake stroke of said pump, spring means operatively coupled to said pump, means for causing said motor to condition said spring means during said intake stroke and for permitting said spring means to effect said discharge stroke, second manually controlled means for effecting sole operation of said wiper motor, and latch means for permitting operation of said pump means after the release of said first manually controlled means.

16. A windshield cleaner system comprising a wiper, a wiper motor for operating the same, pump means having an intake stroke and a discharge stroke, wiper motor-conditioned spring means to operate the pump means on the discharge stroke, release means operable to permit the spring means to effect the discharge stroke, manual control means for initiating operation of said release means, and latch means for maintaining said release means in a position to permit operation of said pump means after the release of said manual control means.

17. A windshield cleaner system comprising a wiper, a wiper motor for operating the same, a normally charged pump means, manual means for operating the pump means to discharge solution onto a windshield, means responsive to the hydrostatic pressure on the discharge stroke to set the wiper motor in operation, and means operable by said wiper motor for recharging the pump means to restore the latter to its normal condition.

18. A windshield cleaner system according to claim 17, wherein pawl and ratchet means are provided to count off a predetermined number of surface drying wiper strokes and then arrest the wiper motor, means being provided and responsive to the hydrostatic pressure for holding said pawl and ratchet means inoperative until after the discharge stroke.

19. A windshield cleaner system according to claim 17, wherein said pressure responsive means includes a rotary spring-urged crank member with means operable in response to the pressure to confine the crank member to increments of movement of approximately one half turn each, and means operable by said crank member for successively rendering the wiper motor operative and inoperative on successive half turns of said crank member.

20. A windshield cleaner system comprising a wiper, a motor for operating the same, a pump having a chamber and a cooperating fluid displacing part, means operable by the motor intermittently to charge the pump chamber by an accumulation of smaller quantities of the solution, manually controlled means operable to impart a discharge stroke of the pump by the actuation of said fluid displacing part, and means responsive to the hydrostatic pressure on the discharge stroke to set the wiper motor in operation.

21. A windshield cleaner system according to claim 5 wherein said pump means has a chamber part and a fluid displacing part relatively movable in one direction to intake solution and in the opposite direction to discharge solution, and said manually controlled means including spring means acted upon during the intake stroke for storing up energy therein to so impart said discharge stroke, said motor operated means acting to impart the intake stroke in a series of incremental divisions to recharge the pump by an accumulation of relatively smaller quantities of the solution, means being provided to releasably hold the spring means in its energy storing condition, said holding means being rendered inoperative by said manually controlled means to so impart the discharge stroke.

22. A windshield cleaner system comprising a wiper blade, a wiper motor for driving said blade, a reservoir for washing solution, pump means having an intake stroke for drawing said washing solution from said reservoir and a discharge stroke for delivering said washing solution in the path of said wiper blade, means coupling said pump means to said wiper motor whereby said wiper motor imparts the intake stroke to said pump means, means conditioned by said wiper motor during said intake stroke for effecting the discharge stroke of said pump means, control means for initiating conjoint operation of said pump means and said wiper motor to effect a windshield cleaning operation, and latch means for permitting said pump means to operate after the release of said manual control means.

References Cited in the file of this patent
UNITED STATES PATENTS

| | | |
|---|---|---|
| 2,816,316 | Oishei | Dec. 17, 1957 |
| 2,878,505 | Ziegler | Mar. 24, 1959 |

FOREIGN PATENTS

| | | |
|---|---|---|
| 750,735 | Great Britain | June 20, 1956 |
| 1,111,220 | France | Oct. 26, 1955 |